US008798021B2

(12) United States Patent
Mangalvedhe et al.

(10) Patent No.: US 8,798,021 B2
(45) Date of Patent: Aug. 5, 2014

(54) HIERARCHICAL NETWORK AND INTERFERENCE MANAGEMENT

(75) Inventors: Nitin Mangalvedhe, Hoffman Estates, IL (US); Amitabha Ghosh, Buffalo Grove, IL (US); Bishwarup Mondal, Schaumburg, IL (US); Rapeepat Ratasuk, Hoffman Estates, IL (US)

(73) Assignee: Nokia Siemens Networks Oy, Espoo (FI)

( * ) Notice: Subject to any disclaimer, the term of this patent is extended or adjusted under 35 U.S.C. 154(b) by 111 days.

(21) Appl. No.: 13/422,459

(22) Filed: Mar. 16, 2012

(65) Prior Publication Data

US 2013/0242748 A1 Sep. 19, 2013

(51) Int. Cl.
*H04W 4/00* (2009.01)
(52) U.S. Cl.
USPC .......................................................... 370/338
(58) Field of Classification Search
USPC .................................. 370/328–350
See application file for complete search history.

(56) References Cited

U.S. PATENT DOCUMENTS

| 2010/0014426 | A1  | 1/2010  | Cavalli et al. ................. | 370/235 |
| 2010/0299419 | A1* | 11/2010 | Ramankutty et al. ......... | 709/221 |
| 2011/0096687 | A1  | 4/2011  | Dottling et al. ............... | 370/252 |
| 2011/0294527 | A1* | 12/2011 | Brueck et al. ................. | 455/466 |
| 2012/0009912 | A1* | 1/2012  | Wang et al. .................... | 455/418 |
| 2012/0122503 | A1* | 5/2012  | Ma et al. ....................... | 455/501 |

FOREIGN PATENT DOCUMENTS

| WO | WO 2010/132884 A1 | 11/2010 |
| WO | WO-2011/020483 A1 | 2/2011 |
| WO | WO-2011020483 A1 | 2/2011 |
| WO | WO 2011/137118 A1 | 11/2011 |
| WO | WO 2011/150250 A1 | 12/2011 |

OTHER PUBLICATIONS

Albal, Nandakishore A., et al., "Video Loading Control", U.S. Appl. No. 13/314,324, filed Dec. 8, 2011, 22 pgs.

* cited by examiner

*Primary Examiner* — Frank Duong
(74) *Attorney, Agent, or Firm* — Harrington & Smith

(57) ABSTRACT

The specification and drawings present a new method, apparatus and software related product (e.g., a computer readable memory) for network management through a hierarchical architecture with a control functionality of a network server (e.g., C-SON) in relationship to clusters comprising eNBs (access points), and for implementing coordinated multi-point (CoMP) transmission and reception in conjunction with inter-cell interference coordination (ICIC) in wireless networks such as LTE wireless networks. In particular, embodiments of the invention describe control and coordination mechanisms among the network elements for different network architectures and use-case scenarios. Such mechanisms may be managed by a centralized self-organizing network controller such as C-SON and hierarchically via localized controllers (such as cluster coordinators) residing in macro eNBs depending on system architectural constraints and network state. A fault-tolerant mechanism then may be defined to recover from failure of controlling sub-elements so that the network remains stable at all times.

22 Claims, 5 Drawing Sheets

HIERARCHICAL NETWORK AND INTERFERENCE MANAGEMENT

TECHNICAL FIELD

The exemplary and non-limiting embodiments of this invention relate generally to wireless communications and more specifically to hierarchical system architecture for network management and for implementing coordinated multipoint (CoMP) transmission and reception in conjunction with inter-cell interference coordination (ICIC) in wireless networks.

BACKGROUND ART

The following abbreviations that may be found in the specification and/or the drawing figures are defined as follows:

| | |
|---|---|
| 3GPP | third generation partnership project |
| ABS | almost blank subframes |
| BS | base station |
| BTS | base transceiver station |
| CB | coordinated beamforming |
| CoMP | coordinated multi-point |
| CQI | channel quality indicator |
| CRE | cell range extension |
| CS | coordinated scheduling |
| CSI | channel state information |
| C-SON | centralized self optimizing network |
| DB | dynamic blanking |
| DL | downlink |
| DPS | dynamic point selection |
| DB | dynamic blanking |
| E-UTRA | evolved universal terrestrial radio access |
| eNB or eNodeB | evolved node B/base station in an E-UTRAN system |
| eICIC | enhanced inter-cell interference coordination |
| E-UTRAN | evolved UTRAN (LTE) |
| HetNet | heterogeneous network |
| ICIC | inter-cell interference coordination |
| ID | identification, identifier |
| JT | joint transmission |
| LTE | long term evolution |
| LTE-A | long term evolution advanced |
| PCID | physical cell ID |
| PRB | physical resource block |
| RI | rank indication |
| RRH | remote radio heads |
| SON | self optimizing network |
| UE | user equipment (e.g. mobile terminal) |
| UL | uplink |
| UMTS | universal mobile telecommunications system |
| UTRAN | universal terrestrial radio access network |
| WiMAX | worldwide interoperability for microwave access |

Existing network solutions involve centralized or distributed network management (e.g., interference management) where each network element such as eNB is managed independently as a separate entity. When the network management is centralized, the management entity seeks and obtains necessary information from each of the network elements.

In large networks such as HetNets, the complexity of network management becomes high. Likewise, in distributed network management, exchange of information among a large number of nodes is necessary. Furthermore, this may not naturally align with the actual network architecture where direct connectivity may not exist among all neighboring network elements or between each eNB and the centralized management entity. Separate solutions for networks with CoMP and eICIC exist, but they do not address joint operation of CoMP and eICIC.

SUMMARY

According to a first aspect of the invention, a method comprising: providing by a network server to one or more clusters coordination instructions comprising results of managing at least one predetermined parameter among the one or more clusters, each cluster comprising a plurality of access points communicating directly with user equipments; and monitoring by the network server a self-coordinated performance of the one or more clusters individually, wherein the each cluster being configured to coordinate performance of the access points based at least in part on the coordination instructions.

According to a second aspect of the invention, a method comprising: coordinating a cluster performance by a cluster coordinator within a cluster which comprises access points wirelessly communicating directly with user equipments, the coordination of the cluster performance at least comprises simultaneous coordinated multi-point operation within the cluster and interference management; and reporting to a network server selected information about the coordination of the cluster performance.

According to a third aspect of the invention, an apparatus comprising: at least one processor and a memory storing a set of computer instructions, in which the processor and the memory storing the computer instructions are configured to cause the apparatus to: provide by a network server to one or more clusters coordination instructions comprising results of managing at least one predetermined parameter among the one or more clusters, each cluster comprising a plurality of access points communicating directly with user equipments; and monitor by the network server a self-coordinated performance of the one or more clusters individually, wherein the each cluster being configured to coordinate performance of the access points based at least in part on the coordination instructions.

According to a fourth aspect of the invention, an apparatus comprising: at least one processor and a memory storing a set of computer instructions, in which the processor and the memory storing the computer instructions are configured to cause the apparatus to: coordinate a cluster performance by a cluster coordinator within a cluster which comprises access points wirelessly communicating directly with user equipments, the coordination of the cluster performance at least comprises simultaneous coordinated multi-point operation and interference management within the cluster; and report to a network server selected information about the coordination of the cluster performance.

According to a fifth aspect of the invention, a computer program product comprising a computer readable medium bearing computer program code embodied herein for use with a computer, the computer program code comprising: code for providing by a network server to one or more clusters coordination instructions comprising results of managing at least one predetermined parameter among the one or more clusters, each cluster comprising a plurality of access points communicating directly with user equipments; and code for monitoring by the network server a self-coordinated performance of the one or more clusters individually, wherein the each cluster being configured to coordinate performance of the access points based at least in part on the coordination instructions.

According to a sixth aspect of the invention, computer program product comprising a computer readable medium bearing computer program code embodied herein for use with a computer, the computer program code comprising: code for coordinating a cluster performance by a cluster coordinator within a cluster which comprises access points wirelessly communicating directly with user equipments, the coordination of the cluster performance at least comprises simultaneous coordinated multi-point operation and interference management within the cluster; and code for reporting to a network server selected information about the coordination of the cluster performance.

BRIEF DESCRIPTION OF THE DRAWINGS:

For a better understanding of the nature and objects of the present invention, reference is made to the following detailed description taken in conjunction with the following drawings, in which.

DETAILED DESCRIPTION

Figure 1:
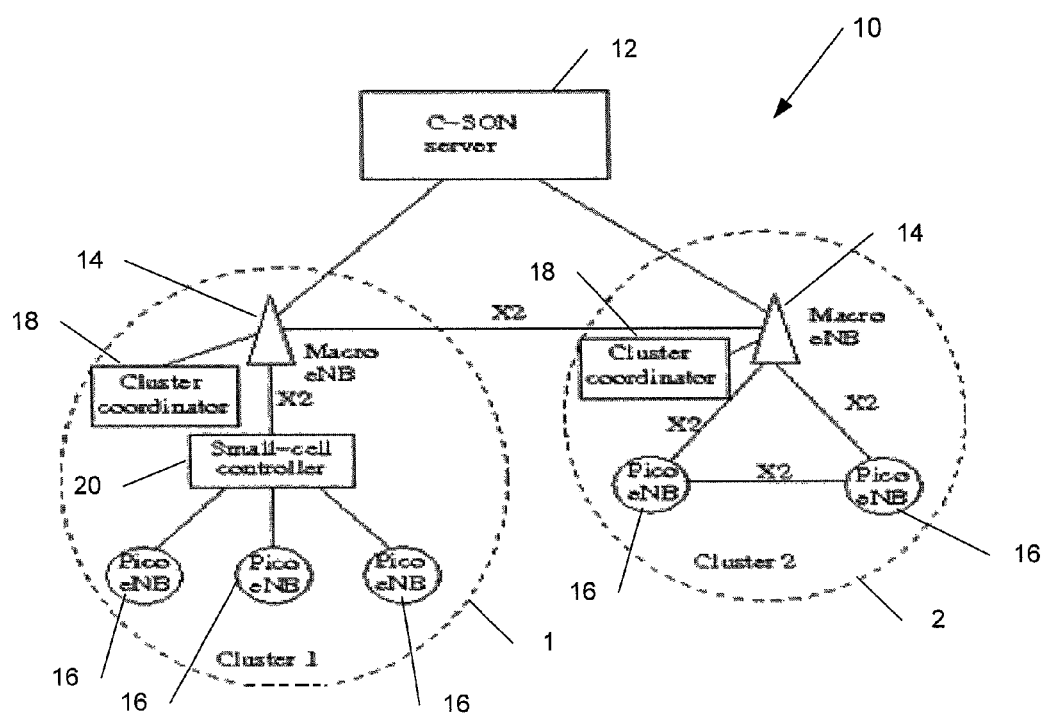
FIG. 1 is a diagram of exemplary Heterogeneous Network Architecture.

A new method, apparatus, and software related product (e.g., a computer readable memory) are presented for network management through a hierarchical architecture with a control functionality of a network server (e.g., C-SON) in relationship to clusters comprising eNBs (access points), and for implementing coordinated multi-point (CoMP) transmission and reception in conjunction with inter-cell interference coordination (ICIC) in wireless networks such as LTE wireless networks. In particular, embodiments of the invention describe control and coordination mechanisms among the network elements for different network architectures and use-case scenarios. Such mechanisms may be managed by a centralized self-organizing network controller such as C-SON and hierarchically via localized controllers (such as cluster coordinators) residing in macro eNBs depending on system architectural constraints and network state. A fault-tolerant mechanism then may be defined to recover from failure of controlling sub-elements so that the network remains stable at all times.

US Patent Application Publication No. 2011/0096687 describes mechanism for automated re-configuration of an access network element using SON-based network management of network elements. However, no aggregated management in hierarchical networks or treatment of eICIC and CoMP operation is disclosed.

PCT Patent Application Publication No. WO 2011/020483 describes centralized load balancing support via centralized load balancing through handovers between cells using handover priorities in flat network architectures.

US Patent Application Publication No. 2010/0014426 describes a method to balance traffic load between nearby LTE/WiMAX cells grouped into inner and border constellations. Distributed load-balancing among groups of nearby cells called constellations is performed through exchange of load information and comparing against target thresholds. Cells common to adjacent constellations participate in load-balancing between cells of the two constellations.

The embodiments of the invention describe the architecture for network management in LTE heterogeneous or homogenous networks. For example, LTE heterogeneous networks may contain a large number pico eNBs in addition to macro eNBs. Network management functions such as load balancing and interference coordination/management in principle can be performed in a distributed or centralized manner. However, there may be architectural constraints such as central control of several pico eNBs in a neighborhood and aggregation of backhaul and S1/X2 interfaces from several nodes. The hierarchical architecture described herein simplifies network management and enables local optimization of management functions. The approach is also a natural fit for practical network architectures with limited direct connectivity between radio access network elements. The provision of a fault tolerant mechanism allows the top-level management entity to take master control in case of problems associated with local management. Thus, local optimization and global optimization of the network parameters can be managed. Methods necessary for joint operation of CoMP and eICIC are described, where eICIC adaption is slow and CoMP scheduling is fast, and the hierarchical network management is suitable for this.

By a way of example, let's consider, as shown in FIG. 1, an LTE heterogeneous network 10 comprising macro eNBs 14 and pico eNBs 16, which exemplify low-power eNBs. Several pico eNBs 16 may be deployed within the coverage area of a macro eNB 14. The macro eNB 14 along with the pico nodes 16 within its control domain together form a "cluster", e.g., see cluster 1 and cluster 2 in FIG. 1. The "cluster" is defined by connectivity to the backbone network (C-SON server 12 shown in FIG. 1): there exists only one physical connection between the cluster and any other element in the network, as depicted in FIG. 1. Note that a cluster may have more than one macro eNB.

The cluster coordinator 18, when present, resides inside the macro eNB 14 and is responsible for managing the elements of the cluster. The cluster may comprise a set of eNBs or transmission/reception points (also can be called BSs, BTSs or network elements) that cooperate for coordinated multi-point (CoMP) transmission and reception. The pico eNBs 16 within the cluster 1 or 2 may all be completely independent and some of their functionality may reside in a small-cell controller 20. The small-cell controller 20 may be a separate entity located close to the pico eNBs 14 as shown in the cluster 1 or it may reside in the macro eNB 14 (this is not illustrated in FIG. 1). In the case of Cluster 1, an X2 interface exists only between the small-cell controller 20 and the macro eNB 16 whereas in cluster 2 the X2 interface exists between the macro eNB 14 and each pico eNB 16 and, optionally, directly between the pico eNBs 16 within the cluster 2. Further, the X2 interface exists between different macro eNBs 14, as in a typical network. Network management in LTE is typically carried out by SON, and in the example shown in FIG. 1 the C-SON server 12 performs the function. Finally, the pico eNBs 16 within the cluster 1 or 2 can have different cell IDs or the same cell ID.

It is noted that embodiments described herein in reference to FIG. 1 extends to a broad class of heterogeneous networks which include macro eNBs (having high transmit power), pico eNBs (having low transmit power) and also other types of low-power nodes such as remote radio heads (RRHs). Indeed, some aspects of the invention would be applicable even in homogeneous networks with eNBs of similar transmit powers (e.g., hierarchical network management, load balancing between clusters, and CoMP within a cluster) or in heterogeneous nodes with eNBs that may not be called "pico"

eNBs but rather "micro" eNBs having higher transmit power than pico eNBs but lower than macro eNBs. But for the purpose of this invention, macro eNBs may be considered as access points of a first type with a high transmit power, and pico eNB, RRHs and/or the like may be considered access points of a second type having a lower transmit power than the macro eNB, wherein a transmission power for the at least one first type access point is larger than for the second type access points in any cluster of the network.

Inter-cell interference coordination (ICIC) in the frequency domain is specified in LTE 3GPP Release-9, enhanced ICIC (eICIC) in the time domain is specified in LTE 3GPP Release-10, and CoMP transmission and reception will be specified in LTE 3GPP Release-11 and beyond. Enhanced ICIC can be supported either with almost blank subframes (ABS) or, alternatively, through using reduced eNB transmission power instead of ABS. CoMP transmission techniques include coordinated scheduling/beamforming (CS/CB), joint transmission (JT), dynamic point selection (DPS), and dynamic blanking (DB). Joint operation of eICIC and CoMP is required to maintain legacy support of UEs prior to the 3GPP Release-11.

A CoMP coordination set is a set of transmission points that are able to coordinate their transmissions. Typically, they will be served by fiber-optic backhaul, and a centralized scheduler will be used for scheduling CoMP transmissions. Alternatively, some transmission points may also be served by wireless backhaul. A CoMP cluster may contain multiple types of transmission points, e.g., 1 macro and 4 pico transmission points. A CoMP coordination set may share a common PCID. It is assumed that transmission points outside the CoMP coordination set are not able to coordinate with a transmission point inside the coordination set for CoMP transmission. As an example, each cluster depicted in FIG. 1 may represent a CoMP coordination set.

Interference management can be achieved through the careful coordination of all of the cells within the network. However, the interference management is closely tied to proper distribution of traffic load within the network. Therefore, the network management entity(s) would be responsible for at least the following functions within its control domain:

load-balancing (including cell-selection biasing);
determining whether CoMP transmission and reception should be enabled and dynamically managing it; and
management of time-domain and frequency-domain interference management on an appropriate time scale.

Network management functions may either be performed completely by the network server such as the C-SON server or this responsibility may be shared with the macro eNBs (i.e., the cluster coordinator) corresponding to each cluster in the hierarchical manner.

The network management may be performed by the network server such as the C-SON server. This is the case of the more traditional architecture where it is assumed that the C-SON server has full knowledge and control of all of the network elements, i.e., not only the macro eNBs but also all of the pico eNBs, even when a small-cell controller exists. The C-SON server is responsible for determination of optimum settings for all of the relevant parameters for load balancing among all of the eNBs (macro, pico, RRH, etc.) in the network. Thus, biasing values for cell range extension (CRE), e.g., of pico eNBs are determined by the C-SON. The bias values are adapted through a closed loop process as dictated by the need for rebalancing loads among cells. Furthermore, the C-SON server is also responsible for managing frequency-domain ICIC and time-domain eICIC. The latter includes determination of the optimum pattern for ABS or low-power subframe transmission.

According to exemplary embodiments of the invention, there is a hierarchical approach to the network management: the C-SON server is still responsible for coordination among all of the clusters (e.g. whereas the cluster coordinator residing in macro eNB is responsible for coordination within the cluster, i.e., among the macro eNB(s), pico eNBs, RRHs, etc. (i.e., all access points) that constitute the cluster). There may be a further hierarchical distribution, for example, of pico eNBs as shown in FIG. 1: if a small-cell controller exists, the cluster coordinator may treat the group of pico cells as a single entity, in which case the small-cell controller is responsible for the pico eNBs that constitute a specific zone of the cluster.

For example, the C-SON server can manage load balancing among the clusters (the coordination instructions sent to clusters by the C-SON may comprise load balancing among the clusters and/or interference managing among the clusters), i.e., the entire cluster is managed as a single entity, and the cluster coordinator is responsible for load balancing among the access points that constitute the cluster. This may include setting optimum biasing values and using the optimum pattern for ABS or reduced-transmit-power subframes. If a small-cell controller exists, it is responsible for load-balancing within the group of pico cells (or RRHs) which it controls as shown in FIG. 1. Also, CoMP operation within the cluster can be managed by the cluster coordinator.

Moreover, the C-SON server can also perform the interference management among clusters. As an example, a frequency-domain or time-domain reuse pattern may be enforced across clusters. Further, the biasing values for CRE of pico eNBs may be determined by the cluster coordinator (and/or possibly by the small-cell controller), which can also adaptively manage the optimum bias values. The cluster coordinator can also manage 3GPP Release-9 ICIC and 3GPP Release-10/11 eICIC within the cluster, which includes determination of the optimum pattern for ABS transmission (for 3GPP Release-10/11 UEs only).

Furthermore, this optimization is overseen by the C-SON server to achieve maximum harmonization among clusters. In order for the C-SON to manage the cluster as a whole, the macro eNB (cluster coordinator) must report the necessary information about the cluster elements to the C-SON server. While the cluster coordinator is responsible for the management of some aspects of the pico eNBs such as CRE biasing values, the pico eNBs (or small-cell controller) may retain management of other functions such as maintenance of neighbor-cell lists.

Joint operation of the eICIC and CoMP is further discussed in the following. CoMP operation typically will require a high-capacity, low-latency backhaul (e.g., fiber-optic) and therefore will be limited to sets of transmission points or eNBs (access points) termed as a CoMP cluster (which may be the cluster 1 or cluster 2 shown in FIG. 1). However, some CoMP techniques can be implemented even when some of the transmission points in the cluster are served by a relatively high-latency backhaul (e.g., wireless). The interface between the cluster to other eNBs and/or other clusters may be of low-capacity and high-latency that may be suitable for the eICIC but not for the CoMP. To manage interference that is created to UEs present outside the CoMP cluster as well as to manage interference that is received from eNBs outside the CoMP cluster, ICIC or eICIC will be needed. Adaptation of ICIC and eICIC between clusters will be slow and can be managed by the C-SON server. On the other hand, CoMP within the cluster can be managed by the cluster coordinator on a faster time scale (e.g., subframe). Different CoMP transmission sets may be defined for transmission during an ABS and a non-ABS, as explained below.

The methods performed within a CoMP coordination set to allow joint operation of the CoMP and eICIC are described further. These methods depend on information obtained from the C-SON server, eNBs outside the CoMP cluster and the UEs served by the CoMP coordination set. These methods will be typically implemented in a centralized fashion in the CoMP coordination set. These methods also provide information such as physical resource block (PRB) utilization and PRB utilization during ABS subframes from the CoMP coordination set to the SON server or eNBs outside the CoMP cluster. The utilization may be averaged over multiple layers (macro, pico, etc.) or multiple transmission points. ABS pattern information may also be shared.

According to one embodiment, within the CoMP coordination set, each UE can be assigned a transmission and a reception point. This is distinct from DPS because this assignment is semi-static. The transmission and the reception point may be different for a given UE. This assignment takes into account the load-balancing instructions from the C-SON server as well as long-term channel quality information from the UE.

Figure 2:
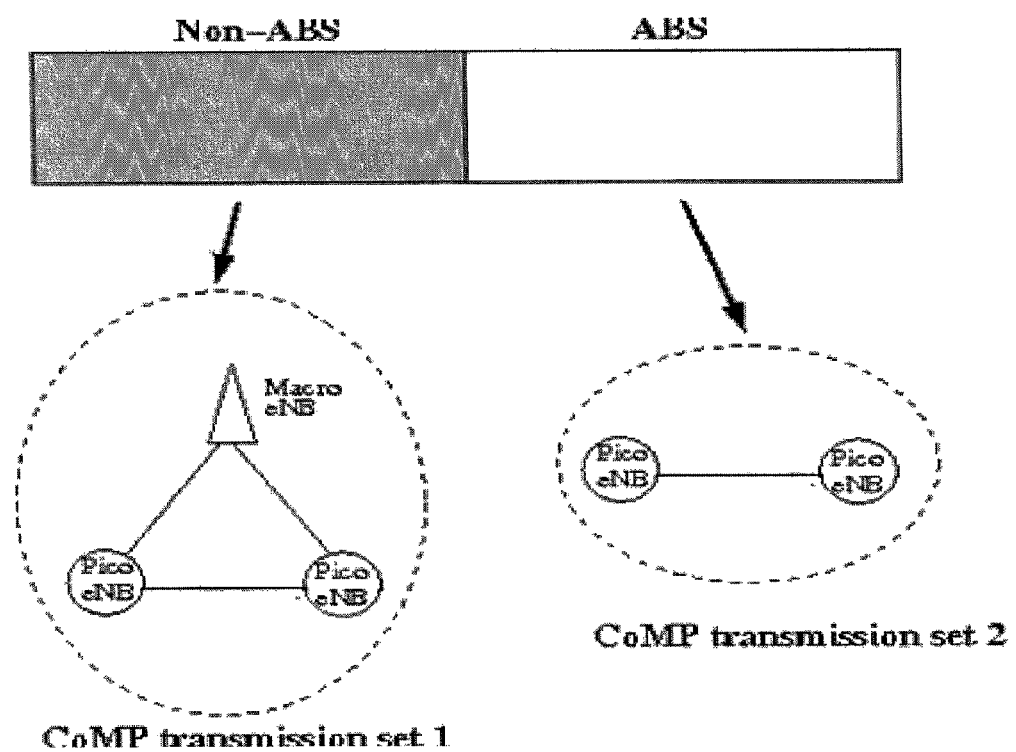
FIG. 2 is a diagram demonstrating joint operation of CoMP with eICIC, according to an embodiment of the invention.

Moreover, the CoMP coordination set can assign a CoMP transmission set for each UE eligible for a CoMP transmission (also there is a possibility to have two CoMP transmission sets for a UE, one for normal subframes (non-ABS) and another for ABS subframes). This is the set of transmission points that can potentially coordinate for a CoMP transmission to that UE. This set also contains the CoMP reporting set for the UE. The CoMP transmission set is determined based on ABS patterns configured by transmission points within the CoMP coordination set. As an example, a transmission point configured in ABS is not included in the CoMP transmission set and the UE is configured to provide CoMP CSI feedback (including CQI/RI) in ABS the subframes, as depicted in FIG. 2. As an alternate example, a transmission point configured in the ABS is included in the CoMP transmission set and the UE is configured to provide CoMP CQI/RI feedback in the non-ABS subframes.

A CoMP transmission set is defined as a set of transmission (or access) points that can potentially coordinate to transmit a single data burst to a UE. The transmission from a CoMP transmission set can occur jointly (joint transmission) or from a single transmission point (coordinated scheduling or dynamic cell selection). This CoMP transmission set can be UE specific and also depend on the nature of the subframe as described below.

A particular UE has two subsets of subframes defined, protected subframes and unprotected subframes. Protected subframes correspond to subframes where one or more dominant interferers are muted (ABS) and unprotected subframes correspond to subframes where the dominant interferers are not muted (non-ABS).

FIG. 2 illustrates that a UE may have two distinct CoMP transmission sets associated with protected and unprotected subframes respectively. As an example in unprotected subframes (non-ABS) the CoMP transmission set1 may include a macro eNB and two pico eNBs. In a protected subframe (ABS) the macro eNB is muted, so the CoMP transmission set2 will exclude the macro eNB and only comprise of the two pico eNBs. In this example the macro eNB is assumed to be a dominant interferer for the UE.

Since the CoMP transmission sets may differ depending on the nature of subframes (protected or unprotected), CoMP CSI feedback from a UE can also depend on the nature of the subframe that the feedback is associated with. As an example, CoMP CSI feedback associated with an unprotected subset of subframes considers CoMP transmission sell for feedback determination/hypothesis while CoMP CSI feedback associated with a protected subset of subframes considers CoMP transmission set2 for feedback determination/hypothesis.

It is noted that the term "protected subframes" for the purpose of this invention may refer to only ABS subframes or to both ABS and low power subframes.

According to another embodiment, a UE may be configured for channel state information (CSI) subframe subsets C-CSI-0 and C-CSI-1. One subset is designated as protected and the other unprotected from a eICIC point of view. In that case CoMP CSI feedback (including CQI/RI) is linked to one of these two subsets. This linkage can be indicated to the UE using higher layer signaling.

In regard to scheduling CoMP transmission in non-almost blank subframe n, the CoMP transmission is considered for UEs configured for the CoMP CSI feedback relevant to the subframe n. Dynamic load balancing among different transmission points and dynamic blanking is considered for scheduling. In the case of scheduling CoMP retransmissions, fall back to non-CoMP transmission techniques is considered and adjustments can be made to account for changes in the ABS status of other transmission points.

In regard to scheduling CoMP transmission in almost blank subframe n, no CoMP first-transmissions are scheduled in the almost blank subframe subframe n. In the case of scheduling CoMP retransmissions, fall back to the non-CoMP transmission techniques is considered and adjustments are made to account for changes in transmit power as well as in the ABS status of other transmission points.

In a further embodiment, in order to ensure optimum system performance and to prevent network instability, a mechanism may be provided for oversight of cluster coordination by the network server such as the C-SON server. The cluster coordinator, while trying to optimize performance within its domain, may enforce a mechanism that is counter-productive to the larger network. Since the C-SON server has visibility of the entire network, it can be provided by the ability to take control of a cluster when needed. This Master/Slave relationship between the C-SON server and the cluster coordinator may ensure that the network does not become unstable. It can also provide a means for continued network operation when there is a local failure of the cluster coordinator. To achieve this, the C-SON server can periodically evaluate the performance of individual clusters the components of which it does not directly control. Examples of metrics that can be evaluated for each cluster include average noise rise, average cell throughput, and average resource utilization. Based on predetermined benchmarks, it can assess the state of each cluster and decide whether or not to claim control and whether re-initialization of cluster parameters is necessary. Thus, the C-SON server can override the authority of the cluster coordinator to manage the elements of the cluster.

The following summarizes how network management may be performed with the hierarchical architecture.

Network management functions may include (but may not be limited to) biasing or load-balancing, ABS power setting, ICIC, eICIC, and CoMP management. These functions are typically static or semi-static. The network server such as the C-SON server has control of all the clusters, some of which may comprise a single macro-eNB or more than one macro eNB. The cluster coordinator in each cluster has control in the cluster of the macro-eNB(s) and all of the lower power eNBs such as pico-eNBs, RRHs, etc. The cluster coordinator may be required to relinquish control of its connected eNBs to the network server such as the C-SON server for network management functions. On the other hand, the cluster coordinator may claim control of its member eNBs from the network server such as the C-SON server for network management functions. If the cluster coordinator is responsible for network management of its eNBs, then it follows the guidelines provided by the C-SON server including ABS pattern template, ABS fraction limitations, and ABS power limitations. In general the guidelines provided by the C-SON server may include information on protected subframes pattern template, protected subframes fraction limitations, and protected subframes power limitations, where the term "protected subframes" may refer to ABS or to both ABS and low power subframes. The network may switch between controlling the cluster by the network server or by the cluster coordinator for performance, stability or other reasons.

Figure 3:
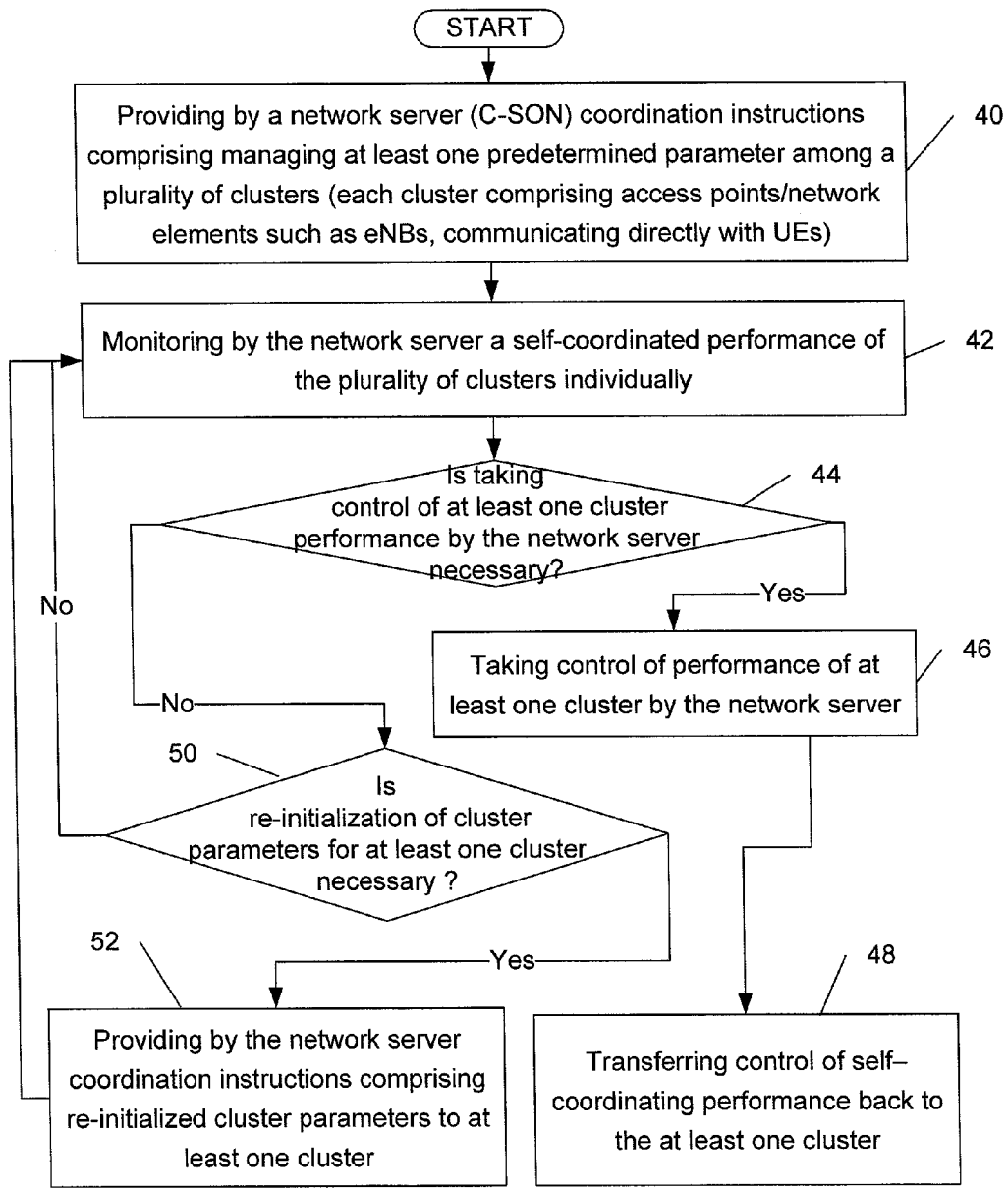
FIG. 3 is a flow chart demonstrating implementation of exemplary embodiments of the invention by a network server such as C-SON.

FIG. 3 shows an exemplary flow chart demonstrating implementation of embodiments of the invention by a network server such as C-SON. It is noted that the order of steps shown in FIG. 3 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 3, in a first step 40, the network server (e.g., C-SON) provides coordination instructions comprising managing at least one predetermined parameter among a plurality of clusters (each cluster comprising access points/network elements such as eNBs, wirelessly communicating directly with UEs). In a next step 42, the network element monitors a self-coordinated performance of the plurality of clusters individually as described herein.

In a next step 44, it is determined by the network controller whether taking control of at least one cluster in the plurality of clusters is necessary based on results of the monitoring. If that is not the case, the process goes to step 50. If however, it is determined in step 44 that taking control of the at least one cluster in the plurality of clusters is necessary, in a next step 46, the network server takes control of performance of at least one cluster as described herein. Then in a next step 48, the network server transfers control of self-coordinating performance back to the at least one cluster based on the monitoring network conditions and/or in response to a request from the cluster coordinator of the at least one cluster by possibly repeating step 40.

In step 50, it is determined whether re-initialization of cluster parameters for at least one cluster is necessary. If this is not the case the process goes to step 42. However, if it is determined in step 50 that re-initialization of the cluster parameters for the at least one cluster is necessary, then in step 52, the network server provides coordination instructions comprising re-initialized cluster parameters to the at least one cluster.

Figure 4:
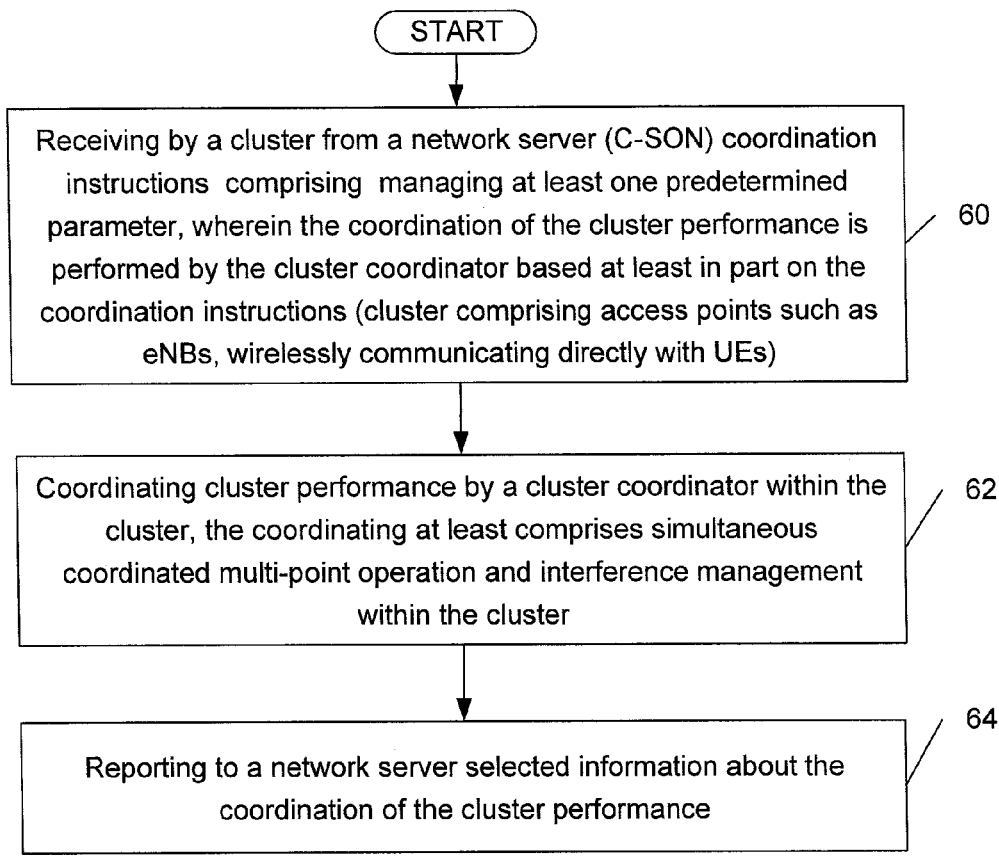
FIG. 4 is a flow chart demonstrating implementation of exemplary embodiments of the invention by a cluster comprising access points.

FIG. 4 shows an exemplary flow chart demonstrating implementation of embodiments of the invention by a cluster comprising multiple access points (e.g., eNBs). It is noted that the order of steps shown in FIG. 4 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 4, in a first step 60, a cluster (or cluster coordinator) receives from a network server (C-SON) coordination instructions comprising managing at least one predetermined parameter, wherein the coordination of the cluster performance is performed by the cluster coordinator based at least in part on the coordination instructions (the cluster comprising access points such as eNBs, wirelessly communicating directly with UEs).

In a next step 62, the cluster coordinator coordinates cluster performance within the cluster, the coordinating at least comprises simultaneous coordinated multi-point operation and interference management within the cluster. In a next step 64, the cluster coordinator reports to the network server (C-SON) selected information about the coordination of the cluster performance, as described herein.

Figure 5:
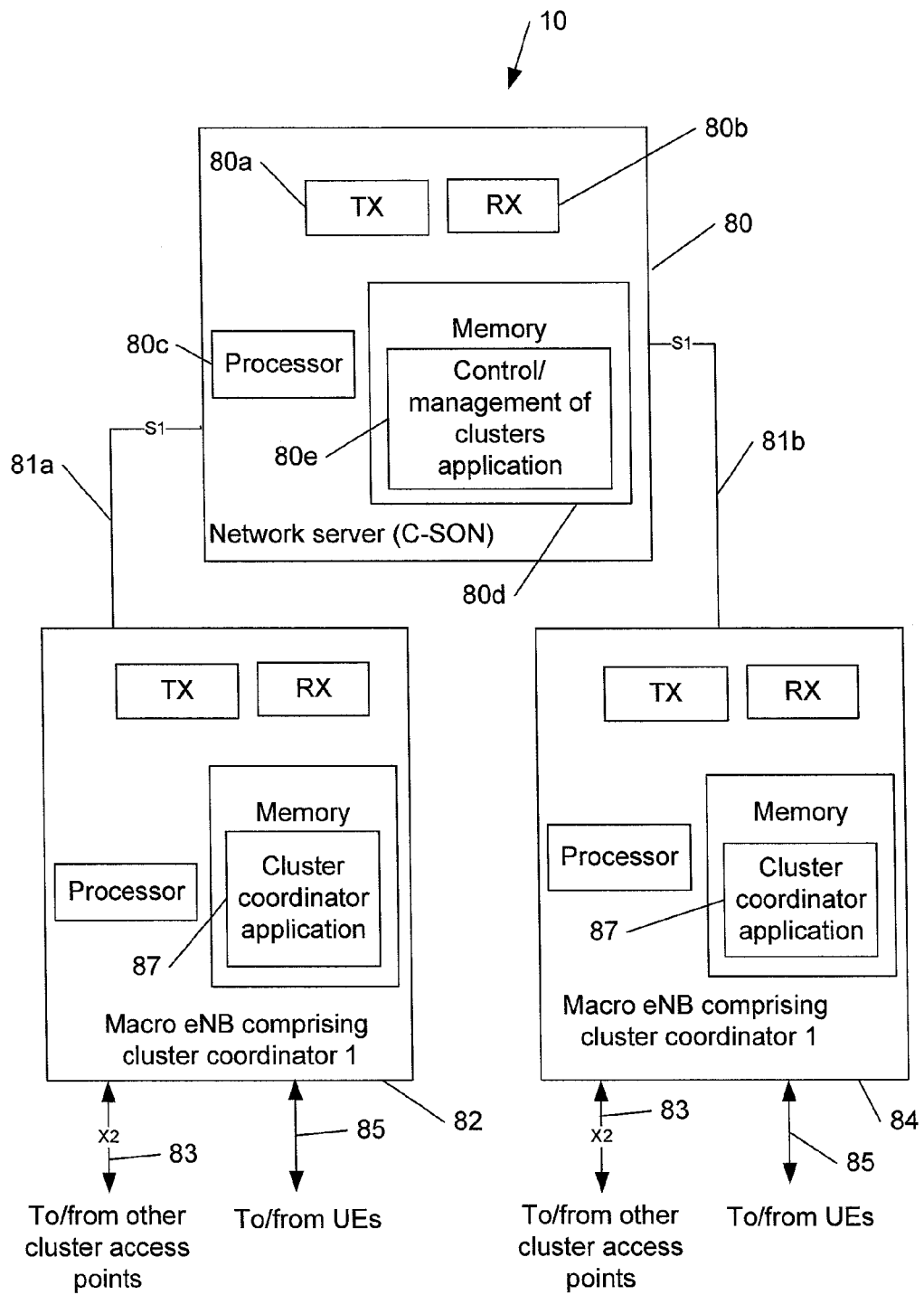
FIG. 5 is a block diagram of network elements for practicing exemplary embodiments of the invention.

FIG. 5 shows an example of a block diagram demonstrating LTE devices including a network element (C-SON) 80 comprised in a network 10, and macro eNBs 82 and 84 comprising cluster coordinators, according to an embodiment of the invention. FIG. 5 is a simplified block diagram of various electronic devices that are suitable for practicing the exemplary embodiments of this invention, e.g., in reference to FIGS. 1-4, and a specific manner in which components of an electronic device are configured to cause that electronic device to operate.

The network element 80 may comprise, e.g., at least one transmitter 80a at least one receiver 80b, at least one processor 80c at least one memory 80d and a control/management of clusters application module 80e. The transmitter 80a and the receiver 80b may be configured to provide a communication (e.g., wired communication) with the cluster devices 82 and 84 (and others not shown in FIG. 5), e.g., through S1 interface using corresponding links 81a and 81b, according to the embodiment of the invention. The transmitter 80a and the receiver 80b may be generally means for transmitting/receiving and may be implemented as a transceiver, or a structural equivalence thereof. It is further noted that the same requirements and considerations are applied to transmitters and receivers of the devices 82 and 84.

Various embodiments of the at least one memory 80d (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 80c include but are not limited to general purpose computers, special purpose computers, microprocessors, digital signal processors (DSPs) and multi-core processors. Similar embodiments are applicable to memories and processors in other devices 82 and 84 shown in FIG. 5.

The control/management of clusters application module 80e may provide various instructions for performing steps 40-52 shown in FIG. 3. The module 80e may be implemented as an application computer program stored in the memory 80d, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 80e may be implemented as a separate block or may be combined with any other module/block of the device 80, or it may be split into several blocks according to their functionality.

The devices 82 and 84 may have similar components as the network element 80, as shown in FIG. 5, so that the above discussion about components of the eNB 80 is fully applicable to the components of the devices 82 and 84. The devices 82 and 84 are connected to other cluster access points (or possibly to small cell controller) via X2 interface and to corresponding UEs via access stratum protocol using links 83 and 85 respectively.

The cluster coordinator application module 87 may provide various instructions for performing steps 60-64 shown in FIG. 4. The module 87 may be implemented as an application computer program stored in the memory of respective devices 82 and 84, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method, comprising:
providing by a network server to one or more clusters coordination instructions comprising results of managing at least one predetermined parameter among the one or more clusters, each cluster comprising a plurality of access points communicating directly with user equipments and including a local cluster coordinator for coordinating a self-coordinated performance within said cluster and reporting the self-coordinated performance to the network server; and
monitoring by the network server the self-coordinated performance of the one or more clusters individually from the reporting by each said local cluster coordinator, wherein the local cluster coordinator of said each cluster is configured to coordinate performance of the access points based at least in part on the coordination instructions, and wherein the self-coordinated performance at least comprises simultaneous coordinated multi-point operation and interference management within the each cluster.

2. The method of claim 1, wherein the coordination instructions comprise one or more of results of: load balancing among the clusters and interference managing among the clusters when the one or more clusters comprise a plurality of clusters.

3. The method of claim 1, wherein the network server is a centralized self optimizing network.

4. The method of claim 1, wherein the plurality of access points comprise at least one first type access point and at least second type access points, wherein a transmission power for the at least one first type access point is larger than for the second type access points, or the plurality of access points comprise only one type of access points.

5. The method of claim 1, further comprising: in response to said monitoring indicating it necessary, temporarily taking control of the performance of at least one cluster of the one or more clusters by the network server; and
transferring control back to said at least one cluster based on at least one of monitoring of network conditions and in response to a request from a cluster coordinator.

6. The method of claim 1, further comprising:
determining by the network server whether taking control of an individual cluster of the one or more of clusters is necessary based on results of the monitoring of the self-coordinated performance of the individual cluster from the reporting by the local cluster coordinator.

7. The method of claim 6, further comprising:
taking control of performance from a cluster in the plurality of clusters by the network server based on results of the monitoring.

8. The method of claim 7, further comprising:
further determining by the network server whether maintaining control of the cluster is still necessary; and
transferring control of self-coordinating performance back to the cluster from the network server based on results of the further determining.

9. The method of claim 1, further comprising:
deciding whether re-initialization of cluster parameters for at least one cluster in the plurality of clusters is necessary based on results of the monitoring.

10. The method of claim 1, wherein the coordination instructions comprise re-initialized cluster parameters.

11. The method of claim 9, wherein re-initialized cluster parameters include one or more of:
protected subframes pattern template, protected subframes fraction limitations and protected subframes power limitations.

12. The method of claim 1, wherein the network server provides the coordination instructions to a cluster coordinator associated with each said cluster, wherein the cluster coordinator is in communication with the network server and the plurality of access points, and wherein the cluster coordinator provides the coordination instructions to the plurality of access points.

13. A method, comprising:
receiving from a network server coordination instructions comprising managing at least one predetermined parameter among one or more clusters;
coordinating, based on the coordination instructions, a cluster performance within a cluster of the one or more clusters, the cluster comprising access points wirelessly communicating directly with user equipments and including a local cluster coordinator for coordinating a self-coordinated performance within said cluster and reporting the self-coordinated performance to the network server, the coordination of the cluster performance at least comprising simultaneous coordinated multi-point operation and interference management within the cluster; and
reporting to the network server from the local cluster coordinator selected information about the coordination of the cluster performance.

14. The method of claim 13, wherein the plurality of access points comprise at least one first type access point and at least second type access points, wherein a transmission power for the at least one first type access point is larger than for the second type access points, or the plurality of access points comprise only first type access points, or the plurality of access points comprise only one type of access points.

15. The method of claim 14, wherein the cluster coordinator is located at the at least one access point.

16. The method of claim 14, wherein the coordination of the second type access points is performed by a small-cell controller communicating with the cluster coordinator.

17. The method of claim 13, further comprising:
receiving by the cluster coordinator from the network server coordination instructions which comprise one or more of results of: load balancing among the clusters and interference managing among the clusters, wherein the coordination of the cluster performance is based at least in part on the coordination instructions.

18. The method of claim 13, wherein the coordination of the cluster performance further comprises setting optimum biasing values within the cluster.

19. The method of claim 13, wherein two or more access points of the cluster form a coordinated multi-point transmission set, and the method further comprises:
managing by the cluster coordinator separate coordinated multi-point transmission sets for protected and unprotected subframes to be used by a user-equipment.

20. The method of claim 19, wherein a channel state information feedback from each user equipment depends on whether the feedback is associated with a protected subset of subframes or with an unprotected subset of subframes.

21. An apparatus comprising:
at least one processor and a memory storing a set of computer instructions, in which the processor and the memory storing the computer instructions are configured to cause the apparatus to:
receive from a network server coordination instructions comprising managing at least one predetermined parameter among one or more clusters;
coordinate, based on the coordination instructions, a cluster performance within a cluster of the one or more clusters, the cluster comprising access points wirelessly communicating directly with user equipments and including a local cluster coordinator for coordinating a self-coordinated performance within said cluster and reporting the self-coordinated performance to the network server, the coordination of the cluster performance at least comprising simultaneous coordinated multi-point operation and interference management within the cluster; and
report to the network server from the local cluster coordinator selected information about the coordination of the cluster performance.

22. An apparatus comprising:
at least one processor and a memory storing a set of computer instructions, in which the processor and the memory storing the computer instructions are configured to cause the apparatus to:
provide by a network server to one or more clusters coordination instructions comprising results of managing at least one predetermined parameter among the one or more clusters, each cluster comprising a plurality of access points communicating directly with user equipments and including a local cluster coordinator for coordinating a self-coordinated performance within said cluster and reporting the self-coordinated performance to the network server; and
monitor by the network server the self-coordinated performance of the one or more clusters individually from the reporting by each said local cluster coordinator, wherein the local cluster coordinator of said each cluster being configured to coordinate performance of the access points based at least in part on the coordination instructions, and wherein the self-coordinated performance at least comprises simultaneous coordinated multi-point operation and interference management within the each cluster.

* * * * *